United States Patent
Li et al.

(10) Patent No.: US 9,432,155 B2
(45) Date of Patent: *Aug. 30, 2016

(54) PARALLEL WIRELESS COMMUNICATION APPARATUS, METHOD, AND SYSTEM

(71) Applicant: Intel Corporation, Santa Clara, CA (US)

(72) Inventors: Qinghua Li, Sunnyvale, CA (US); Minnie Ho, Los Altos, CA (US); Adrian P. Stephens, Cambridge (GB)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,154

(22) Filed: Jan. 20, 2015

(65) Prior Publication Data

US 2015/0139179 A1 May 21, 2015

Related U.S. Application Data

(63) Continuation of application No. 13/339,855, filed on Dec. 29, 2011, now Pat. No. 8,948,139, which is a continuation of application No. 10/745,123, filed on Dec. 23, 2003, now Pat. No. 8,199,723.

(51) Int. Cl.
| | |
|---|---|
| *H04L 1/00* | (2006.01) |
| *H04L 5/00* | (2006.01) |
| *H04W 74/08* | (2009.01) |
| *H04W 88/08* | (2009.01) |
| *H04B 1/7103* | (2011.01) |
| *H04B 1/715* | (2011.01) |

(52) U.S. Cl.
CPC ............ *H04L 5/0023* (2013.01); *H04B 1/7103* (2013.01); *H04B 1/715* (2013.01); *H04W 74/0891* (2013.01); *H04W 88/08* (2013.01)

(58) Field of Classification Search
CPC ... H04W 52/40; H04W 52/41; H04W 52/42; H04W 84/12; H04W 84/13; H04W 84/14; H04W 84/15; H04W 84/16; H04W 74/04; H04W 74/05
USPC ................. 370/329, 334, 338, 345
See application file for complete search history.

(56) References Cited

U.S. PATENT DOCUMENTS

| | | | |
|---|---|---|---|
| 5,515,378 | A | 5/1996 | Roy, III et al. |
| 5,586,119 | A | 12/1996 | Scribano et al. |
| 5,642,353 | A | 6/1997 | Roy, III et al. |

(Continued)

FOREIGN PATENT DOCUMENTS

| | | |
|---|---|---|
| EP | 0926916 A2 | 6/1999 |
| EP | 1263168 A2 | 12/2002 |

(Continued)

OTHER PUBLICATIONS

Office Action Received for Chinese Patent Application No. 200480038725.4, mailed on Oct. 23, 2009, 4 pages of Office Action and 7 pages of English translation.

(Continued)

*Primary Examiner* — Dady Chery
(74) *Attorney, Agent, or Firm* — Shichrur & Co.

(57) ABSTRACT

An access point in a wireless network communicates with multiple mobile stations simultaneously using spatial-division multiple access.

17 Claims, 8 Drawing Sheets

(56) References Cited

U.S. PATENT DOCUMENTS

| | | |
|---|---|---|
| 6,721,302 B1 | 4/2004 | Alastalo |
| 6,990,116 B1 | 1/2006 | Young et al. |
| 7,046,651 B2 | 5/2006 | Terry |
| 7,352,718 B1 | 4/2008 | Perahia et al. |
| 2001/0047424 A1 | 11/2001 | Alastalo et al. |
| 2002/0071384 A1 | 6/2002 | Hall et al. |
| 2002/0181492 A1 | 12/2002 | Kasami et al. |
| 2003/0053480 A1 | 3/2003 | Jang et al. |
| 2003/0222817 A1 | 12/2003 | Gfeller et al. |
| 2003/0227914 A1 | 12/2003 | Nguyen |
| 2003/0236103 A1 | 12/2003 | Tamaki et al. |
| 2004/0196834 A1 | 10/2004 | Ofek et al. |
| 2005/0144307 A1 | 6/2005 | Li et al. |
| 2005/0147075 A1 | 7/2005 | Terry |
| 2005/0165946 A1 | 7/2005 | Stephens |
| 2006/0029073 A1 | 2/2006 | Cervello et al. |
| 2006/0153117 A1 | 7/2006 | Bichot et al. |
| 2006/0153148 A1 | 7/2006 | Bichot et al. |
| 2006/0187895 A1 | 8/2006 | Nandagopalan |
| 2007/0104171 A1 | 5/2007 | Kasami et al. |
| 2009/0310619 A1 | 12/2009 | Brommer |

FOREIGN PATENT DOCUMENTS

| | | |
|---|---|---|
| WO | 02/41647 A2 | 5/2002 |
| WO | 2005/067218 A1 | 7/2005 |

OTHER PUBLICATIONS

Office Action Received for European Patent Application No. 04814123.8, mailed on Jan. 12, 2007, 7 pages of Office Action.
Notice of Allowance Received for U.S. Appl. No. 10/745,123, mailed on Nov. 10, 2011, 7 pages.
International Preliminary Report on Patentability Received for PCT Patent Application No. PCT/US2004/041902, mailed on Jul. 6, 2006, 9 pages.
Office Action Received for Chinese Patent Application No. 200480038725.4, mailed on Feb. 15, 2008, 8 pages of Office Action and 15 pages of English translation.
Written Opinion of the International Searching Authority Received for PCT Patent Application No. PCT/US2004/041902 mailed on May 17, 2005, 7 pages.
International Search Report Received for PCT Patent Application No. PCT/US2004/041902, mailed on May 17, 2005, 8 pages.
Information Technology—Telecommunications and information exchange between systems—Local and metropolitan area networks—Specific requirements, ISO/IEC 8802-11 (1999), ANSI/IEEE Std.802.11, Part 11 :Wireless LAN Medium Access Controi(MAC) and Physical Layer(PHY) Specifications, Chapter 9,{1999},pp. 70-97.
Office Action Received for Chinese Patent Application No. 200480038725.4. mailed on Apr. 29, 2010, 3 pages of Office Action and 9 pages of English translation.
Office Action Received for U.S. Appl. No. 10/745,123, mailed on Jul. 8, 2011, 17 pages.
Office Action Received for U.S. Appl. No. 10/745,123, mailed on Feb. 15, 2011, 15 pages.
Office Action Received for U.S. Appl. No. 10/745,123, mailed on Sep. 14, 2010, 10 pages.
Office Action Received for U.S. Appl. No. 10/745,123, mailed on Apr. 8, 2010, 13 pages.
Office Action Received for U.S. Appl. No. 10/745,123, mailed on Nov. 19, 2009, 12 pages.
Office Action Received for U.S. Appl. No. 10/745,123, mailed on Apr. 14, 2009, 12 pages.
Office Action Received for U.S. Appl. No. 10/745,123, mailed on Oct. 7, 2008, 12 pages.
Office Action Received for U.S. Appl. No. 10/745,123, mailed on Jul. 11, 2007, 13 pages.
Office Action Received for Chinese Patent Application No. 200480038725.4. mailed on Jan. 31, 2012, 3 pages of Office Action and 5 pages of English translation.
Office Action Received for Chinese Patent Application No. 200480038725.4. mailed on Jul. 2, 2012, 3 pages of Office Action and 8 pages of English translation.
Office Action for Chinese Patent Application Serial No. 200480038725.4, mailed on Mar. 24, 2016, 7 pages (Including 4 pages of English translation).

PARALLEL WIRELESS COMMUNICATION APPARATUS, METHOD, AND SYSTEM

This application is a continuation of U.S. patent application Ser. No. 13/339,855, filed Dec. 29, 2011 entitled "PARALLEL WIRELESS COMMUNICATION APPARATUS, METHOD, AND SYSTEM", which is a continuation of U.S. patent application Ser. No. 10/745,123, filed Dec. 23, 2003 entitled "PARALLEL WIRELESS COMMUNICATION APPARATUS, METHOD, AND SYSTEM", now patented as U.S. Pat. No. 8,199,723 issued on Jun. 12, 2012 which is incorporated by reference herein in it entirety.

FIELD

The present invention relates generally to computer networks, and more specifically to wireless networks.

BACKGROUND

Wireless networks typically include mobile stations and access points. An access point may communicate with many different mobile stations, but typically communicates with only one mobile station at a time.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
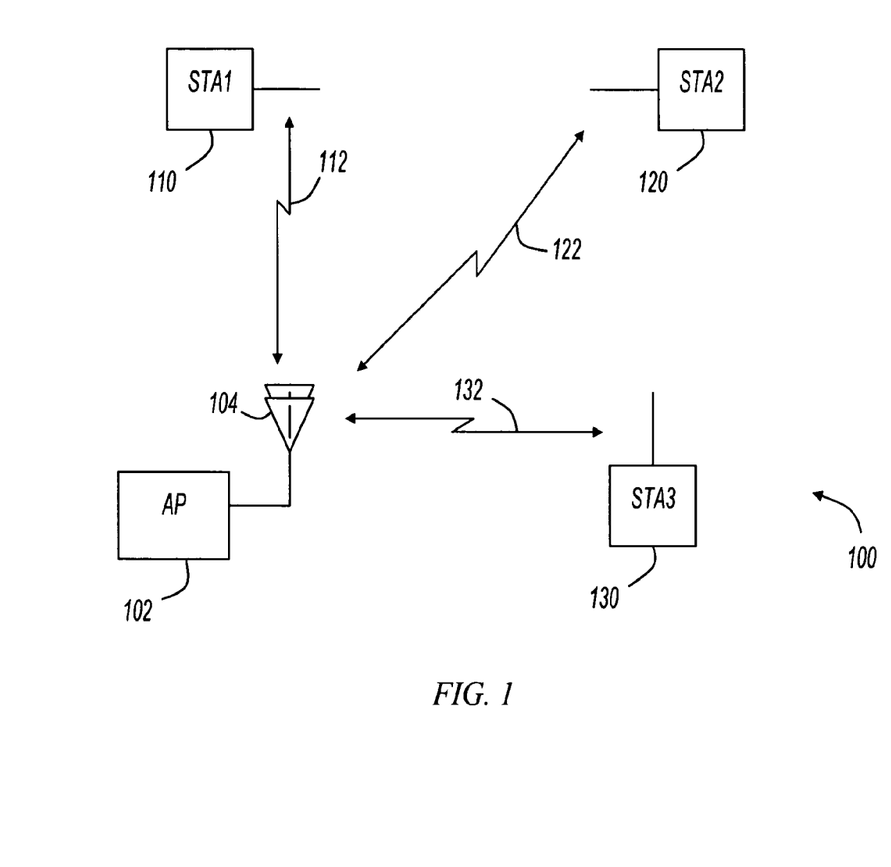
FIG. 1 shows a diagram of a wireless network.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

As explained below, in some embodiments, mobile stations 110, 120, and 130 operate in compliance with an 802.11 standard, and access point 102 is capable of maintaining simultaneous 802.11 compliant communications with multiple mobile stations. Mobile stations 110, 120, and 130 may be any type of mobile station capable of communicating in network 100. For example, the mobile stations may be computers, personal digital assistants, wireless-capable cellular phones, or the like.

Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132. When access point 102 sends signals to one or more mobile stations, this is referred to as the "downlink," and when access point 102 receives signals from one or more mobile stations, this is referred to as the "uplink." In various embodiments of the present invention, access point 102 may communicate simultaneously with multiple mobile stations on the downlink and may communicate simultaneously with multiple mobile stations on the uplink.

Access point 102 includes antennas 104. Access point 102 may be any type of access point having multiple antennas capable of communicating using spatial-division multiple access (SDMA). Spatial-division multiple access is a technique that allows multiple simultaneous independent transmissions from one wireless device that has multiple antennas to other wireless devices that may or may not have multiple antennas. For example, in some embodiments, access point 102 utilizes SDMA on the downlink to transmit to two or more of mobile stations 110, 120, or 130 simultaneously. Also for example, in some embodiments, access point 102 utilizes SDMA on the uplink to receive from two or more of mobile stations 110, 120, or 130 simultaneously. As used herein, the terms "parallel stations," "parallel group," or "parallel STAs" refer to a group of mobile stations that communicate simultaneously with access point 102.

In some embodiments of the present invention, a medium access control layer (MAC) in access point 102 controls the timing and contents of SDMA transmissions to parallel STAs. For example, a MAC in access point 102 may coordinate the timing of frames sent to multiple stations such that the frames end near in time to each other. When the multiple mobile stations respond, the MAC receives the responses, even if they overlap in time. Various embodiments of SDMA transmissions are described below with reference to FIGS. 4-9.

Spatial-division multiple access increases both user density and network throughput of wireless systems by utilizing spatial channels in the environment. For example, multiple spatial channels may be formed by a combination of the signal path(s) and the antenna patterns between an AP and multiple STAs.

In some embodiments, access point 102 may use zero-forcing beamformers for both downlink and uplink of signals to achieve SDMA. The zero-forcing beamformer is a known technique for SDMA interference cancellation using known channel state information. In some embodiments, channel state information is gathered by access point 102 during a prior uplink packet reception. Various embodiments of gathering state information, also referred to as "estimating spatial channels," is described below with reference to FIGS. 2 and 3.

Figure 2:
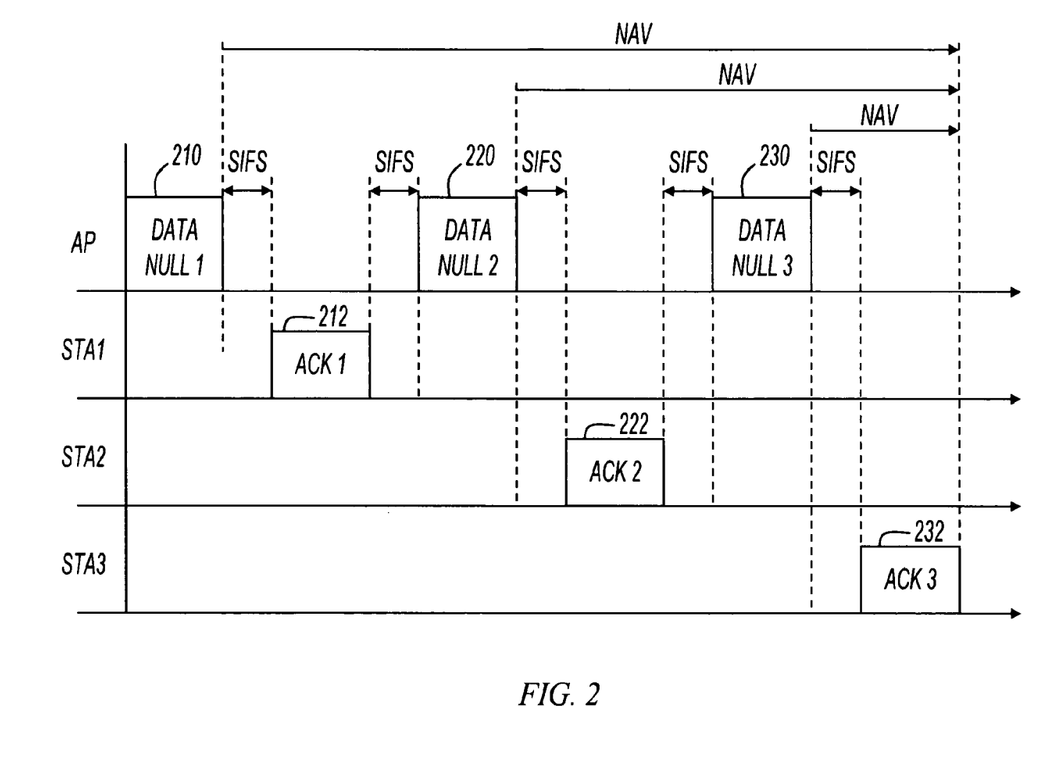
FIGS. 2 and 3 show frame sequences to estimate channel state information of communications channels.
Figure 3:
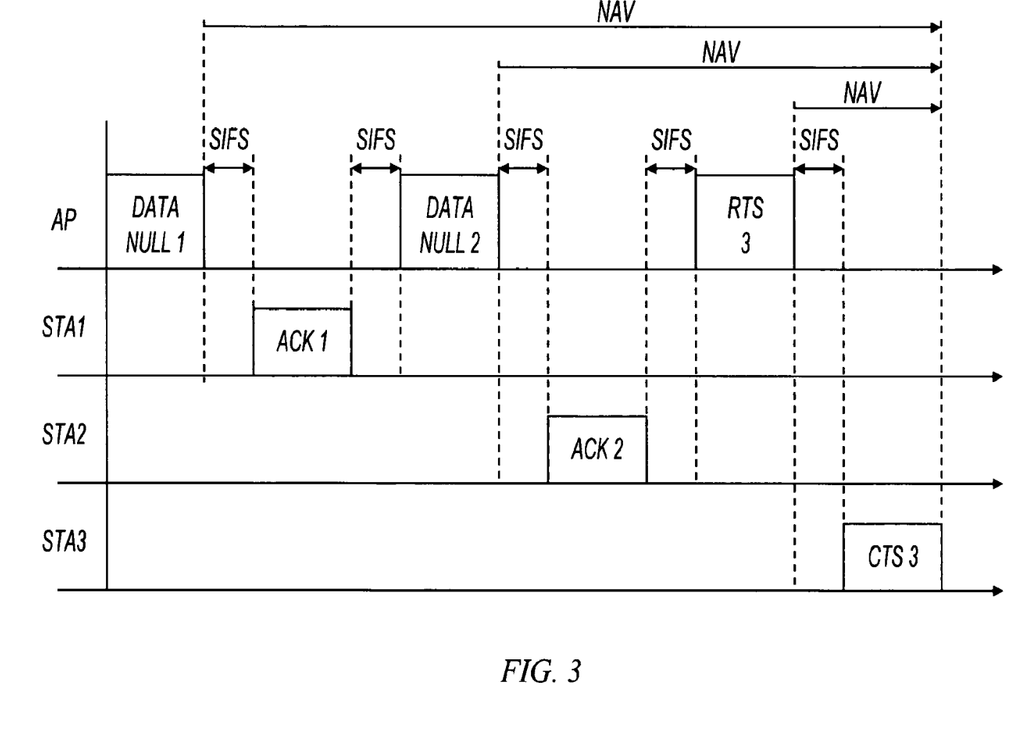

FIGS. 2 and 3 show frame sequences to estimate channel state information of communications channels. In some embodiments, channel state information of all STAs in a parallel group may be obtained before SDMA transmission and reception. Referring now to FIG. 2, an AP sends short frames and forces STAs to send back short frames. As shown in FIG. 2, in some embodiments, an AP sends IEEE 802.11 Null-data frames in turn to STAs and estimates the STAs' channels from the received acknowledgement (ACK) frames. For example, as shown in FIG. 2, the AP sends a Null-data frame 210 to STA1, which returns ACK frame 212; the AP sends Null-data frame 220 to STA2, which returns ACK frame 222; and the AP sends Null-data frame 230 to STA3, which returns ACK frame 232. Embodiments represented by FIG. 2 may be employed after channel access using either point coordination function (PCF), or distributed coordination function (DCF) of an 802.11 MAC protocol, but the invention is not limited in this respect. In some embodiments, transmission of Null-data frames may have the side effect of setting the NAV of all STAs in range because the Null-data frames may be transmitted using nominally omni-directional antenna patterns In some embodiments, frames other than Null-data frames and ACK frames are utilized to estimate spatial channels. For example, in some embodiments, frames such as IEEE 802.11 request-to-send (RTS) and clear-to-send (CTS) frames are utilized to estimate spatial channels. In some embodiments, RTS and CTS frames are sent following channel access using the DCF of an 802.11 MAC protocol. Regardless of the type of frame utilized, the network-allocation-vector (NAV) may be set to the end of the last ACK or CTS to prevent an unintended STA from acquiring the medium during the SDMA training process. Whenever an AP loses channel information of a STA, it can employ various embodiments of spatial channel estimation to update channel information. Many different possible frame types may be utilized to estimate spatial channels without departing from the scope of the present invention.

Referring now to FIG. 3, an AP utilizes a combination of Null-data frames and RTS frames to send back short frames. In embodiments represented by FIG. 3, the final Null-data frame may be replaced with an RTS frame (which solicits a CTS response). In some embodiments, this may have the side effect of setting the NAV of all STAs in range because the RTS and CTS may both be transmitted using nominally omni-directional antenna patterns.

FIGS. 4-7 show SDMA frame sequences that correspond to parallel communications using the IEEE 802.11 point coordination function (PCF). In some embodiments, frames sent using PCF are sent during a contention-free (CF) period. During the contention-free period, STAs cannot initiate frame exchange sequences because their NAV timer prevents channel access using DCF. They transmit only in two cases: a STA transmits an acknowledgement frame (ACK) after receiving a data (or management) frame directed to it; and a STA transmits after receiving a frame with a contention-free-poll (CF-Poll). In other words, STAs transmit during a contention-free period only if the AP solicits a response. The STAs may include polled, unpolled, pollable, and unpollable STAs.

Figure 4:
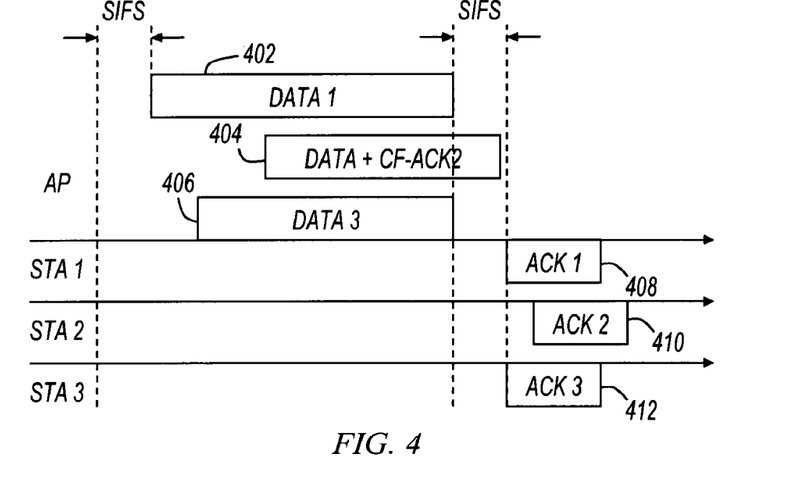
FIGS. 4-9 show spatial-division multiple access download frame sequences.

Referring now to FIG. 4, an AP sends Data frames or Data+CF-Ack frames to parallel STAs using SDMA and then switches to receive mode to receive ACKs from the STAs in parallel using SDMA. For example, the AP sends Data frame 402 to STA1, Data+CF-Ack frame 404 to STA2, and Data frame 406 to STA3. In some embodiments, the multiple frames sent simultaneously on the downlink are coordinated in time such that they all end within a predetermined time window. For example, as shown in FIG. 4, frames 402, 404, and 406 all end within a predetermined time window equal to one IEEE 802.11 short interframe spacing (SIFS). In some embodiments, the predetermined time window is greater than or less than one SIFS. For example, in some embodiments, the predetermined time window is substantially equal to a short-interframe spacing (SIFS) period plus 10% of a slot time.

In response to the frames send to the STAs, the STAs transmit ACK frames back to the AP. For example, STA1 transmits ACK frame 408; STA2 transmits ACK frame 410; and STA3 transmits ACK frame 412. Although as shown in FIG. 4 STA2 may hear STA1's transmission of ACK, STA2 will still transmit its ACK since an 802.11 compliant STA will send an ACK (or CF-ACK) regardless of the channel idle/busy status.

By utilizing SDMA, the AP is able to transmit information in different spatial channels to parallel STAs simultaneously. Further, the AP is able to receive information from parallel STAs simultaneously using separate spatial channels. As shown in FIG. 4, the parallel transmissions are ended prior to an expected start time of the first response. In general, the parallel transmissions all end in a window in time having a width that is related to the short interframe spacing (SIFS).

Figure 5:
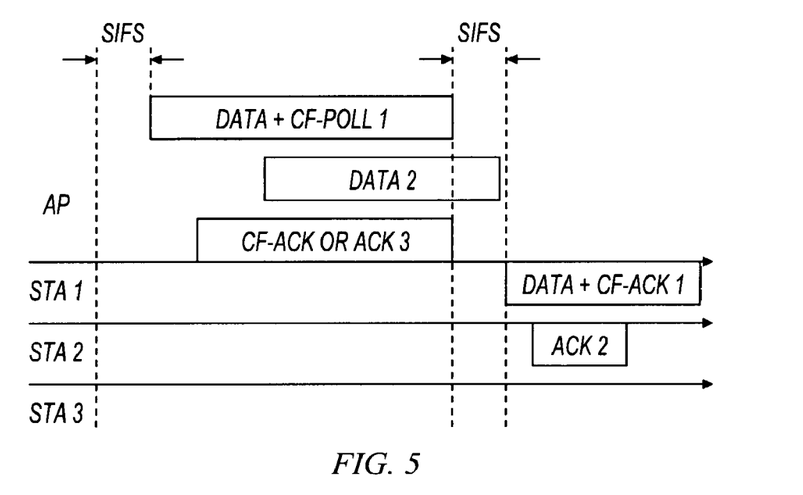

Referring now to FIG. 5, the AP sends multiple frames of the following IEEE 802.11 types: Data, Data+CF-ACK, ACK, or CF-ACK frames. Further, in some embodiments, the AP may add a single CF-Poll in the frames to ask for data from one STA. If the CF-ACK is added, one of the frames, i.e., Data+CF-ACK, Data+CF-ACK+CF-Poll, CF-ACK+ CF-Poll may be sent in the parallel group of transmissions. The downlink sequences shown in FIGS. 4 and 5 generally do not cause retransmissions in the uplinks. In contrast, the downlink sequence in FIG. 6, described below, may cause retransmission in the uplink.

Figure 6:
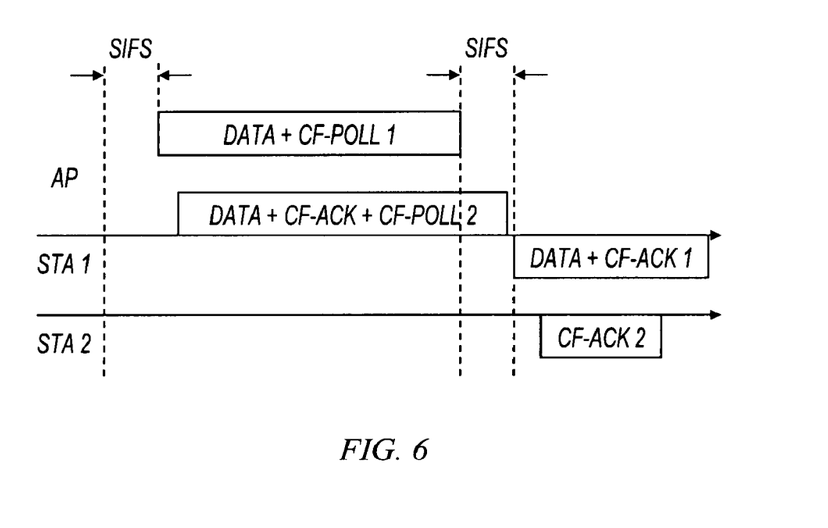

Referring now to FIG. 6, the AP sends Data frames along with multiple CF-Polls in the parallel group of transmissions to ask for uplink traffic. The timing relationships are the same as that described above with reference to FIG. 4. If the termination time instances of the uplink frames from multiple STAs that require acknowledgments are within a time window, (e.g., one SIFS period plus 10% of a slot time), the AP doesn't cause retransmission in the uplink. In some embodiments, only those uplink frames requesting an acknowledgement matter to the time window. If the termination time instances spread over the time window, then the AP still receives the acknowledgements from the STAs, but it may not acknowledge the received uplink Data frames in time. If the AP sends out the acknowledgements late, it may cause retransmission in the uplink depending on the ACK-Timeout implementation on the STAs. The specific example shown in the FIG. 6 does not cause uplink retransmission.

Figure 7:
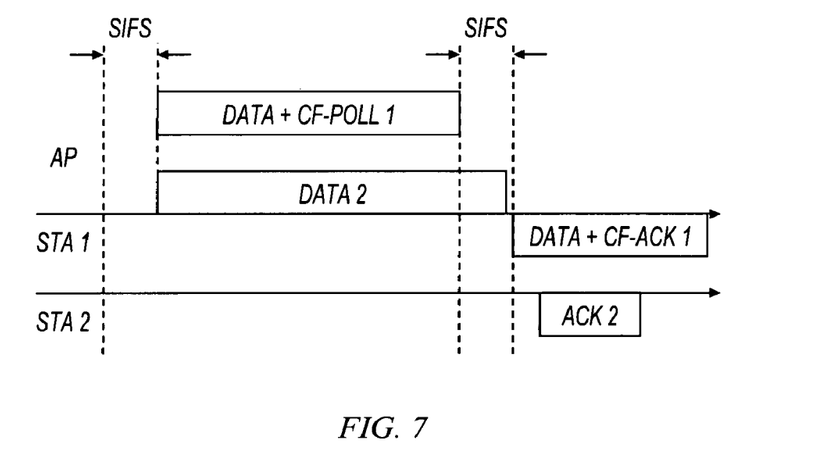

Referring now to FIG. 7, an example is shown where efficiency is improved by sending data in the guard gap, (e.g., one SIFS period). In this example, the AP knows that STA1 has data to send and that STA2 hasn't data to send. This information may be retrieved from the more-data fields of frames previously received. The AP predicts that the uplink transmission of STA1 should be longer than the one of STA2. So, the AP sends more data to STA2 than to STA 1 to exploit the guard gap between transmission and reception of STA1's data.

Figure 8:
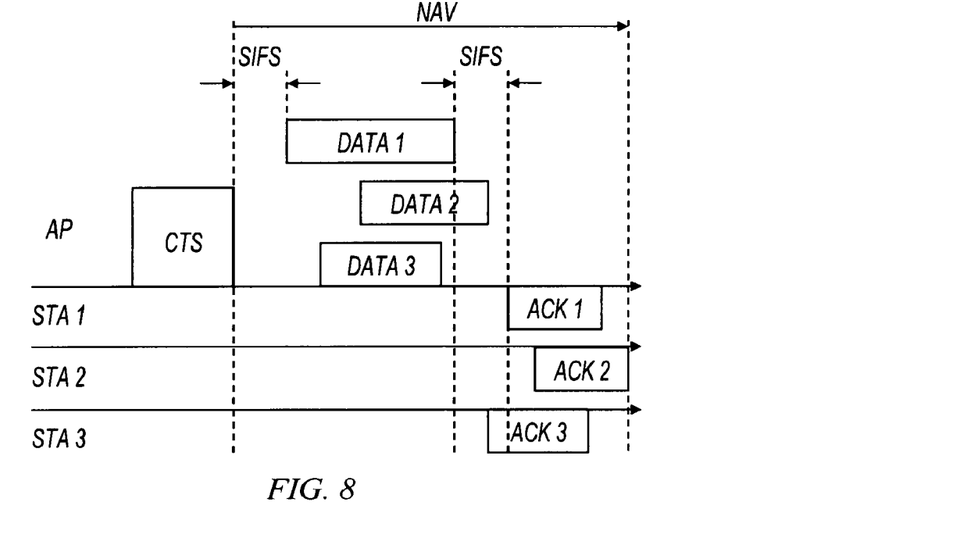
Figure 9:
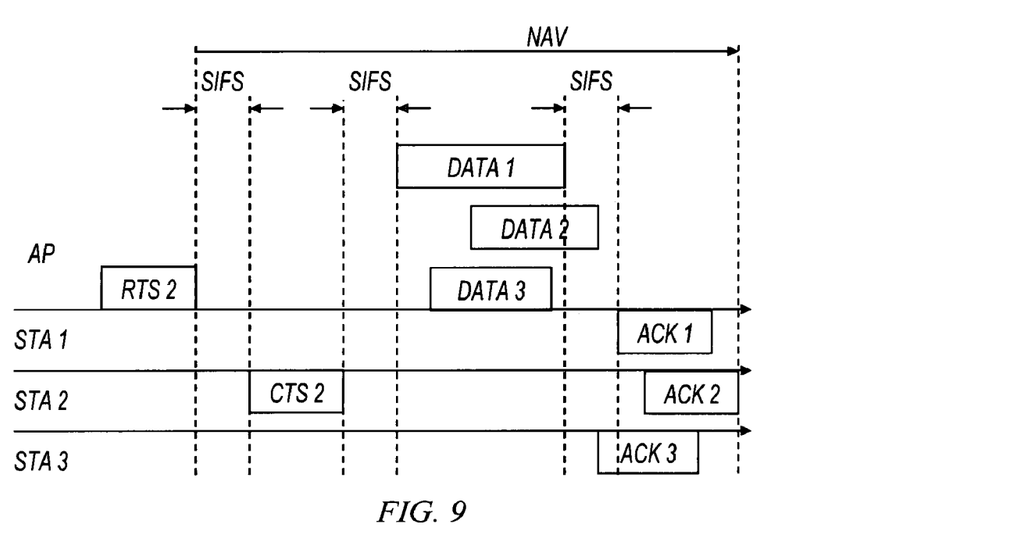

The frame sequences shown in FIGS. 8 and 9 correspond to parallel communications using distributed coordination function (DCF). The AP sets the network-allocation-vector (NAV) of all STAs in the vicinity to prevent unintended STAs from interfering with the beamformed signals. The NAV can be set by transmission of RTS or CTS frames using nominally omni-directional radiation antennas. FIG. 8 shows the AP setting the NAV using a broadcast CTS frame, and FIG. 9 shows the AP setting the NAV using a unicast RTS frame addressed to one of the STAs in its parallel group. As in the previous figures, the termination times of the parallel frames are coordinated to end in a time window. In some embodiments, the time window is related to a short interframe spacing (SIFS), and in some embodiments, the time window is substantially equal to a short-interframe spacing (SIFS) period plus 10% of a slot time.

Figure 10:
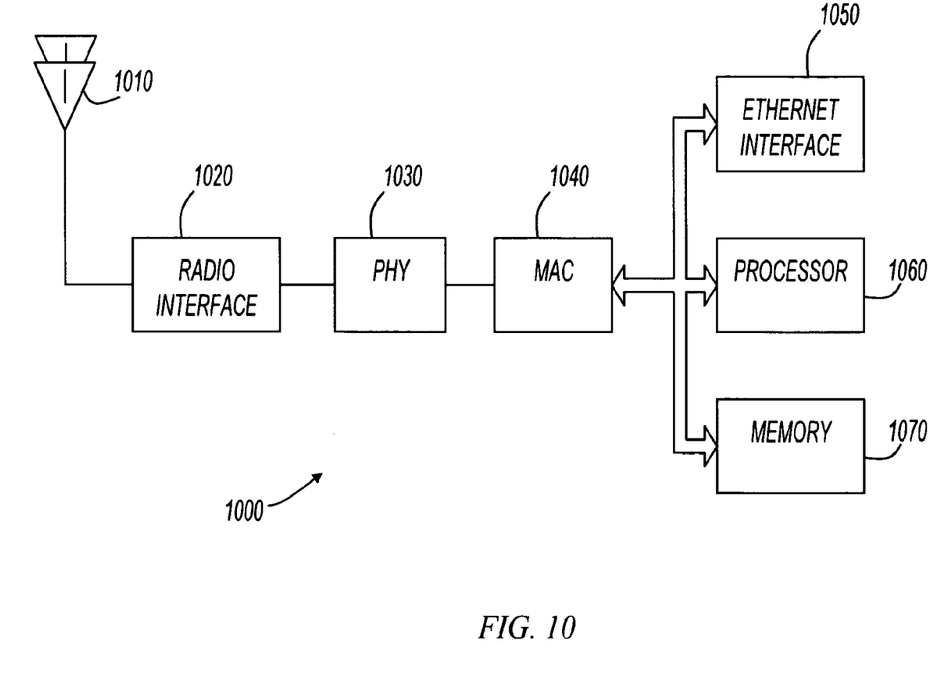
FIG. 10 shows a system diagram in accordance with various embodiments of the present invention.

FIG. 10 shows a system diagram in accordance with various embodiments of the present invention. Electronic system 1000 includes antennas 1010, radio interface 1020, physical layer (PHY) 1030, media access control (MAC) mechanism 1040, Ethernet interface 1050, processor 1060, and memory 1070. In some embodiments, electronic system 1000 may be an access point that can communicate in parallel with multiple 802.11 compliant mobile stations. For example, electronic system 1000 may be utilized in network 100 as access point 102. Also for example electronic system 1000 may be an access point capable of communicating with mobile stations using frame sequences shown in the previous figures.

In some embodiments, electronic system 1000 may represent a system that includes an access point as well as other circuits. For example, in some embodiments, electronic system 1000 may be a computer, such as a personal computer, a workstation, or the like, that includes an access point as a peripheral or as an integrated unit. Further, electronic system 1000 may include a series of access points that are coupled together in a network.

In operation, system 1000 sends and receives signals using antennas 1010, and the signals are processed by the various elements shown in FIG. 10. Antennas 1010 may be an antenna array or any type of antenna structure that supports SDMA.

Radio interface 1020 is coupled to antennas 1010 to interact with a wireless network. Radio interface 1020 may include circuitry to support the transmission and reception of radio frequency (RF) signals. For example, in some embodiments, radio interface 1020 includes an RF receiver to receive signals and perform "front end" processing such as low noise amplification (LNA), filtering, frequency conversion or the like. Further, in some embodiments, radio interface 1020 includes beamforming circuitry to support SDMA processing. Also for example, in some embodiments, radio interface 1020 includes circuits to support frequency upconversion, and an RF transmitter. The invention is not limited by the contents or function of radio interface 1020.

Physical layer (PHY) 1030 may be any suitable physical layer implementation. For example, PHY 1030 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM).

Media access control (MAC) mechanism 1040 may be any suitable media access control layer implementation. For example, MAC 1040 may be implemented in software, or hardware or any combination thereof. In some embodiments, a portion of MAC 1040 may be implemented in hardware, and a portion may be implemented in software that is executed by processor 1060. Further, MAC 1040 may include a processor separate from processor 1060. MAC 1040 may implement any of the parallel communications embodiments of the present invention. For example, MAC 1040 may provide frames and their coordinated timing to achieve parallel communications using SDMA.

Figure 11:
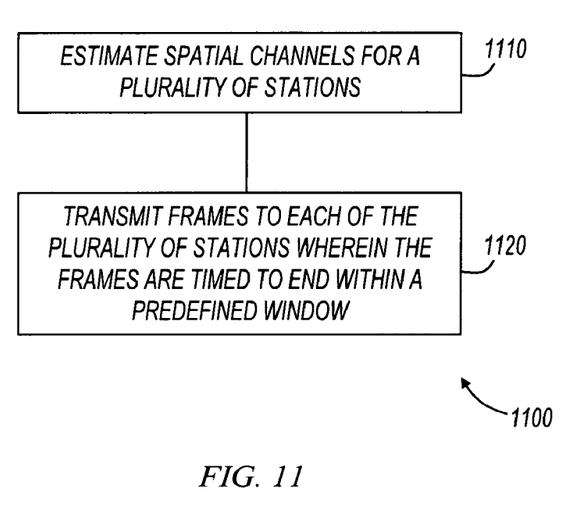
FIG. 11 shows a flowchart in accordance with various embodiments of the present invention.

Processor 1060 may perform method embodiments of the present invention, such as method 1100 (FIG. 11). Processor 1060 represents any type of processor, including but not limited to, a microprocessor, a digital signal processor, a microcontroller, or the like.

Memory 1070 represents an article that includes a machine readable medium. For example, memory 1070 represents a random access memory (RAM), dynamic random access memory (DRAM), static random access memory (SRAM), read only memory (ROM), flash memory, or any other type of article that includes a medium readable by processor 1060. Memory 1070 may store instructions for performing the execution of the various method embodiments of the present invention.

Ethernet interface 1050 may provide communications between electronic system 1000 and other systems. For example, in some embodiments, electronic system 1000 may be an access point that utilizes Ethernet interface 1050 to communicate with a wired network or to communicate with other access points. Some embodiments of the present invention do not include Ethernet interface 1050. For example, in some embodiments, electronic system 1000 may be a network interface card (NIC) that communicates with a computer or network using a bus or other type of port.

FIG. 11 shows a flowchart in accordance with various embodiments of the present invention. In some embodiments, method 1100 may be used to communicate with parallel mobile stations using SDMA. In some embodiments, method 1100, or portions thereof, is performed by an access point, a processor, or an electronic system, embodiments of which are shown in the various figures. Method 1100 is not limited by the particular type of apparatus, software element, or system performing the method. The various actions in method 1100 may be performed in the order presented, or may be performed in a different order. Further, in some embodiments, some actions listed in FIG. 11 are omitted from method 1100.

Method 1100 is shown beginning at block 1110 in which an access point estimates spatial channels for a plurality of stations. In some embodiments, this corresponds to sending frames to each of the plurality of stations in turn, and receiving frames back. For example, referring now back to FIG. 2, null-data frames may be sent, and ACK frames may be received. Also for example, referring now back to FIG. 3, an RTS frame may be sent and a CTS frame may be received. In some embodiments, each spatial channel is estimated from the received frames.

At 1120, frames are transmitted to each of the plurality of stations wherein the frames are timed to end within a predefined window. In some embodiments, the frames have a format compatible with an IEEE 802.11 standard. The frames may be sent using point coordination function (PCF) or distributed coordination function (DCF). Any type of suitable frame may be transmitted, including but not limited to, RTS, CTS, polling frames, and non-polling frames. The length of the predefined window may be related to the length of a short interframe space (SIFS) or other space. For example, in some embodiments, the predefined window may be substantially equal to a SIFS plus 10% of a slot time.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A device comprising:
a physical (PHY) layer component arranged to implement orthogonal frequency division multiplexing (OFDM) in downlink transmissions;
a radio interface to receive spatial channel estimation signals from a plurality of mobile stations in uplink transmissions, and to provide multiple access to the plurality of mobile stations through spatial-division multiple access (SDMA) using zero-forcing beamforming; and
a media access control (MAC) layer arranged to estimate spatial channels between the device and the plurality of mobile stations, wherein the MAC layer is further arranged to provide coordinated timing of time-coordinated frames between the device and the plurality of mobile stations, the time-coordinated frames end within a pre-determined time window,
wherein the device is further arranged to implement direct sequence spread spectrum (DSSS) or frequency hopping spread spectrum (FHSS) modulation.

2. The device of claim 1, wherein the device is further arranged to transmit frames simultaneously to the plurality of mobile stations.

3. The device of claim 1, wherein the device is part of a fixed station further comprising antennas, a processor, and a memory.

4. The device of claim 1, wherein the device is further adapted to gather channel state information from one or more of the mobile stations.

5. The device of claim 1, wherein the device is further arranged to control timing and contents of SDMA transmissions to the plurality of mobile stations.

6. A device, comprising:
a radio interface comprising antennas and circuitry to support transmission and reception of radio frequency signals, wherein the radio interface is arranged to transmit a spatial channel estimation signal in an uplink transmission to a receiver, the radio interface arranged to communicate with the receiver as a station of a plurality of mobile stations through spatial-division multiple access (SDMA);
a physical (PHY) layer arranged to communicate using orthogonal frequency division multiplexing (OFDM), wherein the PHY layer is further arranged to implement direct sequence spread spectrum (DSSS) or frequency hopping spread spectrum (FHSS) modulation; and
a media access control (MAC) layer arranged to transmit time-coordinated frames to the receiver, wherein the time-coordinated frames are transmitted from the device simultaneously in parallel transmissions with other frames from the plurality of mobile stations, and wherein the parallel transmissions are timed to end within a pre-determined time window.

7. The device of claim 6, wherein the device is part of a mobile station further comprising antennas, a processor, and a memory.

8. The device of claim 6, wherein a width of the pre-determined time window is related to a short interframe spacing (SIFS) plus 10% of a slot time.

9. The device of claim 6, wherein a width of the pre-determined time window is equal to a short interframe spacing (SIFS) plus 10% of a slot time.

10. The device of claim 6, wherein the radio is further arranged to communicate SDMA transmissions to the receiver according to timing and contents controlled by the receiver.

11. The device of claim 6, wherein the receiver is arranged to predict that an uplink transmission from the device is longer than an uplink transmission from a second mobile station from the plurality of mobile stations and is further arranged to send more data to the second mobile station.

12. The device of claim 6, wherein the radio interface of the device comprises beamforming circuitry.

13. A method comprising:
transmitting a first signal for channel estimation;
receiving, by a receiver implementing direct sequence spread spectrum (DSSS) or frequency hopping spread spectrum (FHSS) modulation, spatial channel estimation signals from a plurality of mobile stations;
estimating spatial channels between the receiver and the plurality of mobile stations;
determining that a first mobile station of the plurality of mobile stations has more data to send to the receiver than a second mobile station of the plurality of mobile stations; and
transmitting frames simultaneously to the plurality of mobile stations through spatial-division multiple access (SDMA) using zero-forcing beamforming, wherein the transmitted frames are coordinated in time to end within a predetermined time window, and wherein more data is sent to the second mobile station than the first mobile station.

14. The method of claim 13, further comprising controlling timing and contents of the SDMA transmissions to the plurality of mobile stations.

15. A method comprising:
receiving, by a mobile station, a first signal for channel estimation;
transmitting a spatial channel estimation signal in an uplink transmission to a receiver; and
transmitting time-coordinated frames to the receiver, wherein the time-coordinated frames are transmitted from the mobile station simultaneously in parallel transmissions with other frames from one or more other mobile stations using spatial-division multiple access (SDMA), and wherein the parallel transmissions are timed to end within a pre-determined time window.

16. The method of claim 15, wherein the receiver is arranged to predict that an uplink transmission from the mobile station is longer than an uplink transmission from a second mobile station from the plurality of mobile stations, and wherein the receiver is further arranged to send more data to the second mobile station.

17. The method of claim 15, wherein the mobile station is a cellular phone.

* * * * *